(12) United States Patent
Hunkele (10) Patent No.: US 6,190,568 B1
(45) Date of Patent: Feb. 20, 2001

(54) METHOD FOR RETROFITTING A FALSE BOTTOM UNDERDRAIN FILTER SYSTEM

(75) Inventor: Gary Hunkele, Midland, PA (US)

(73) Assignee: Tetra Process Technologies div of Capital Controls, A Severn Trent Services Co, Tampa, FL (US)

( * ) Notice: Under 35 U.S.C. 154(b), the term of this patent shall be extended for 0 days.

(21) Appl. No.: 09/044,598

(22) Filed: Mar. 19, 1998

(51) Int. Cl.[7] .................................................. B01D 24/22
(52) U.S. Cl. ........................ 210/767; 210/792; 210/293
(58) Field of Search .................................. 210/293, 792, 210/767

(56) References Cited

U.S. PATENT DOCUMENTS

| | | | |
|---|---|---|---|
| 1,151,313 | * 8/1915 | Wheeler | 210/293 |
| 3,110,667 | * 11/1963 | Stuppy . | |
| 3,178,026 | * 4/1965 | Christy | 210/293 |
| 4,222,876 | * 9/1980 | Englehart | 210/293 |
| 4,619,765 | * 10/1986 | Roberts | 210/293 |
| 4,923,606 | 5/1990 | Gresh et al. | 210/275 |
| 5,149,427 | 9/1992 | Brown et al. | 210/274 |
| 5,232,592 | 8/1993 | Brown et al. | 210/274 |
| 5,618,431 | 4/1997 | Kondo et al. | 210/618 |
| 5,635,079 | 6/1997 | Becking, II | 210/767 |

OTHER PUBLICATIONS

Fluid Treatment Media Support System, Apr. 24, 1997 PCT International Application/No. WO 97/40907.
Jun. 25, 1990 griffith et al. Case Histories of Filter Underdrain Gravel Moundings.

\* cited by examiner

Primary Examiner—Robert J. Popovics
(74) Attorney, Agent, or Firm—Jo Katherine D'Ambrosio (57) ABSTRACT

A method for retrofitting a gravity filter with a porous plate filter media support that increase filter production by increasing the depth of the media, allows installation of an air backwash system in filters having a monolithic underdrain system, and reduces turbulence and head loss in granular filtration systems. The method comprising removal of existing media and gravel media-support bed and installation of a porous plate media support. The porous plate can have multiple layers of fine sized and coarse sized pores. The porous plate is positioned between the media and the filter bottom and is securely anchored to the monolithic underdrain system thereby allowing uniform distribution of backwash, inhibiting media penetration of the filter bottom and avoiding seal failures.

9 Claims, 5 Drawing Sheets

METHOD OF RETROFITTING A GRAVITY FILTER WITH A POROUS PLATE

| |
|---|
| removing the existing gravel media-support bed from the filter underdrain system<br>100 |

| |
|---|
| removing the porcelain spheres from the depressions<br>200 |

| |
|---|
| installing at least one porous plate over the cone-shaped depressions, the porous plate comprising pores sized for uniform distribution of backwash<br>300 |

| |
|---|
| anchoring the porous plate to the concrete floor of the monolithic bottom<br>400 |

| |
|---|
| backwashing the filter underdrain system to determine areas of turbulence, if any<br>500 |

| |
|---|
| adjusting the porous plate to eliminate excess turbulence<br>600 |

| |
|---|
| positioning an air distribution grid between the porous plate and the cone-shaped depressions<br>700 |

| |
|---|
| securing the porous plate with a hold down bar<br>800 |

| |
|---|
| replacing the media<br>900 |

Fig. 8

METHOD OF FILTERING THROUGH A RETROFITTED GRAVITY FILTER

| |
|---|
| flowing influent water into the top of the filter |
| 110 |

| |
|---|
| draining the influent water through the media and the porous plate so that solid debris and flocculation particles are trapped between the media particles |
| 120 |

| |
|---|
| collecting the filtered water into conduits below the monolithic false bottom |
| 130 |

| |
|---|
| piping the filtered water to a clearwell for future use |
| 140 |

| |
|---|
| backwashing the filter with an upflow of water from the clearwell through the porous plate so that the backwash water is uniformly distributed throughout the filter media |
| 150 |

| |
|---|
| discharging the backwash water from the top of the filter thereby removing the solid debris and flocculation particles from the filter media |
| 160 |

| |
|---|
| piping pressurized air into an air grid positioned below the porous plate so that the air flows through the porous plate to create air bubbles of a size to dislodge solid debris and flocculation particles thereby further cleansing the filter media |
| 170 |

METHOD FOR RETROFITTING A FALSE BOTTOM UNDERDRAIN FILTER SYSTEM

FIELD OF THE INVENTION

The present invention relates to a method for using a gravity filter, specifically a method for using a gravity filter with a retrofitted underdrain system. More specifically the invention relates to a method of retrofitting the gravel media support bed in a monolithic filter underdrain system with one or more porous plates.

BACKGROUND OF THE INVENTION

Water, wastewater and liquid granular filtration units used by municipalities and large industrial plants typically employ a gravity filter system to produce useful water and liquids. These filters have an underdrain system that serves multiple purposes; the underdrain system supports and separates the filter media from the filter bottom, collects the water that passes through the media, and distributes backwash water and/or air across the filter.

Figure 1:
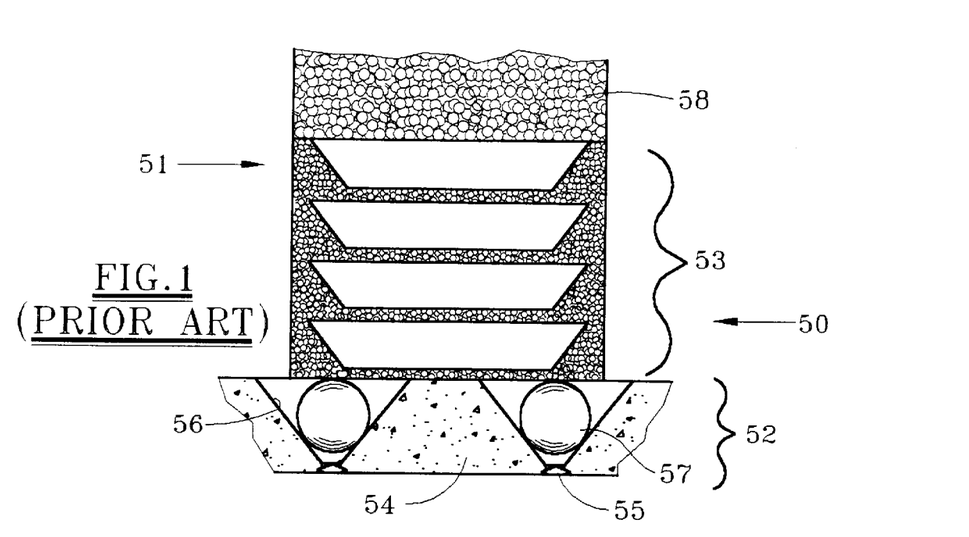
FIG. 1 is a cross-section of a monolithic false bottom filter underdrain system comprising a prior art gravel media support bed.

Underdrain systems are frequently made of concrete blocks having spaces to allow for piping that is part of the backwash distribution system and sumps that collect the filtrate. One type of underdrain system commonly used in municipal filters is a monolithic false bottom underdrain system. Referring to FIG. 1, the monolithic bottom underdrain system is referred to as a false bottom system because it is comprised of inverted pyramidal or cone-shaped depressions cast into a concrete block 54 that overlays the structural floor or true bottom of the filter housing. At the inverted apex of each depression is a porcelain thimble (or nozzle) 55 leading to the collecting sump below the false bottom. The concrete underdrain system 52 is supported above the structural floor or true bottom of the filter by ledges provided in the filter walls and by supporting piers. Monolithic underdrain systems have used gravel support beds as media support systems. Media in gravity filters serve to filter the influent water for the removal of solid debris and flocculated particles. The media can be sand, coal or a combination of both. A media support system, such as the gravel bed 53 shown in FIG. 1, supports and separates the media from the underdrain system. When layered gravel beds are used, the bed of gravel is usually 12 to 18 inches in height with several layers of varying size gravel. Porcelain spheres 57 ranging in size from about one inch to about three inches are placed to fit snugly into the cone-shaped depressions. The porcelain spheres support the gravel layer above the depressions to allow for a backwash system. During the filtration process, debris and flocculated particles tend to clog the media and gravel layers and therefore must be removed periodically. Water backwash under high velocity is used to cleanse the media and gravel layers of this debris. Air backwash is also desirable because of the improved scouring properties of compressed air. Until the present invention, however, air backwash was not possible in gravity filters having monolithic underdrain systems.

Gravel layers used as a media support bed in monolithic underdrain systems have several disadvantages. A primary disadvantage is the uneven distribution of backwash resulting from jet turbulence patterns in water backwash. Other disadvantages of gravel layer support beds include difficulty in reinstallation, the need for deeper filter boxes to allow for the depth of the gravel and inability to use an air backwash or scouring with system, which enhances the cleansing process of the media. Also the gradation of the gravel layers tends to be disturbed during the filtration and backwashing processes and downtime may be required to restore the desired gradation.

A precast concrete, plastic-jacketed underdrain block is disclosed in U.S. Pat. No. 4,923,606 to Gresh et al. Nozzle-less type underdrain systems with large openings for the passage of the filtrate and the backwash water are preferred because they do not plug as easily as nozzle type underdrains. Because the openings in nozzle-less underdrains are larger than the size of the individual grains of the media, however, it is necessary to use a media support system between the underdrains and the media. U.S. Pat. Nos. 5,149,427 and 5,232,592 to Brown disclose a cap for filter underdrain blocks comprising a porous, planar body. The body of the cap is said to be adapted to support a fine grain filter media without the media penetrating therethrough. The pores in the cap body are approximately 700–800 microns in size.

U.S. Pat. No. 5,618,431 to Kondo et al. discloses a method of preparing and cleaning floating filter medium for biological filtering apparatus. The steps of the Kondo '431 method are: forming a filter layer of granular floating filter medium having a specific gravity of about 0.3 or less and a particle size of 1 to 15 mm; allowing wastewater to enter the treating tank and flow through the filter; and separating and removing excess sludge from the filter medium by discharging an amount of water equivalent to from 0.5 to 1.5 times the filling amount of the filter medium in a time of between 5 to 90 seconds. A method and apparatus for filtering water with reduced spillage is disclosed in U.S. Pat. No. 5,635,079 to Becking, II . A water filtration unit which is sealed with an upper and a lower plastic bottle is taught by the '079 patent.

Porous plates have been used to replace gravel layers. Porous plates are typically manufactured from sintered plastics. Plastic porous plates, however, are usually buoyant and need to be secured in some way to prevent lifting, especially during the backwash cycle. Prior art methods of securing the porous plate include a combination of screwing and caulking or grouting the plate to the underdrain blocks as disclosed in U.S. Pat. No. 5,149,427 to Brown, or bolting the plate to the underdrain blocks. Small irregularities in the floor of the filter, the underdrain blocks and the plates can cause seal failures between the plates. Seal failure allows media to penetrate the media support system, causes a progressive failure of the filter underdrain and then of the filter system itself. The underdrains, effluent piping, and clearwell may become plugged with media and the filter bottom may collapse due to excessive pressures which develop during backwash. Savage, in PCT International Publication WO 97/40907 entitled Fluid Treatment Media Support System, incorporated herein by reference, discloses a porous plate with multiple layers of fine sized and coarse sized pores and a system for anchoring the porous plate to air laterals below concrete block underdrain systems.

None of the above-referenced patents disclose or teach a method of retrofitting a monolithic false bottom underdrain system with a porous plate that supports the media, allows for an air distribution system that uniformly distributes air backwash, and securely anchors the porous plate to the filter bottom. Nor do they teach a method of filtration using a monolithic false bottom underdrain system retrofitted with a securely anchored porous plate that allows for both air and water backwash.

What is needed is a method for retrofitting gravity filters with a securely anchored filter media support system that uniformly distributes backwash throughout the media. A method for retrofitting gravity filters with a filter media support system that allows the utilization of an air backwash to further scrub the filter media would also be beneficial.

SUMMARY OF THE INVENTION

The present invention relates to a method for retrofitting a gravity filter having a monolithic false bottom filter underdrain system. One preferred method useful with an underdrain system comprising a concrete bottom wherein the concrete bottom forms cone-shaped depressions, the underdrain system further comprising porcelain spheres positioned within the depressions to support a gravel media-support bed, the method comprises the steps of: (a) removing the existing media and gravel media-support bed from the filter underdrain system; (b) removing the porcelain spheres from the depressions; (c) installing at least one porous plate over the cone-shaped depression, the porous plate comprising pores sized for uniform distribution of backwash; and (d) anchoring the porous plate to the concrete floor of the monolithic bottom.

Another preferred method for retrofitting a gravity filter having a filter underdrain system with a gravel media-support bed comprises the steps of: (a) removing the existing media and gravel media-support bed from the filter underdrain system; (b) removing any other matter from the filter underdrain system; (c) installing at least one porous plate over the filter underdrain system, the porous plate comprising pores sized for uniform distribution of backwash; and (d) anchoring the porous plate into the bottom of the underdrain system for securing the porous plate.

In a method of filtering water by means of a filter comprising upright walls defining at least one compartment housing granular filter media supported above a true filter bottom by a monolithic false bottom filter underdrain system, the underdrain system comprising a porous plate having pores sized for uniform distribution of backwash, the method comprises the steps of: (a) flowing influent water into the top of the filter;(b) draining the influent water through the media and the porous plate so that solid debris and flocculated particles are trapped between the media particles; (c) collecting the filtered water into conduits below the monolithic false bottom; (d) piping the filtered water to a clearwell for future use; (e) backwashing the filter with an upflow of water from the clearwell through the porous plate so that the backwash water is uniformly distributed throughout the filter media; and (f) discharging the backwash water from the top of the filter thereby removing the solid debris and flocculated particles from the filter media.

DETAILED DESCRIPTION OF THE INVENTION

Figure 2:
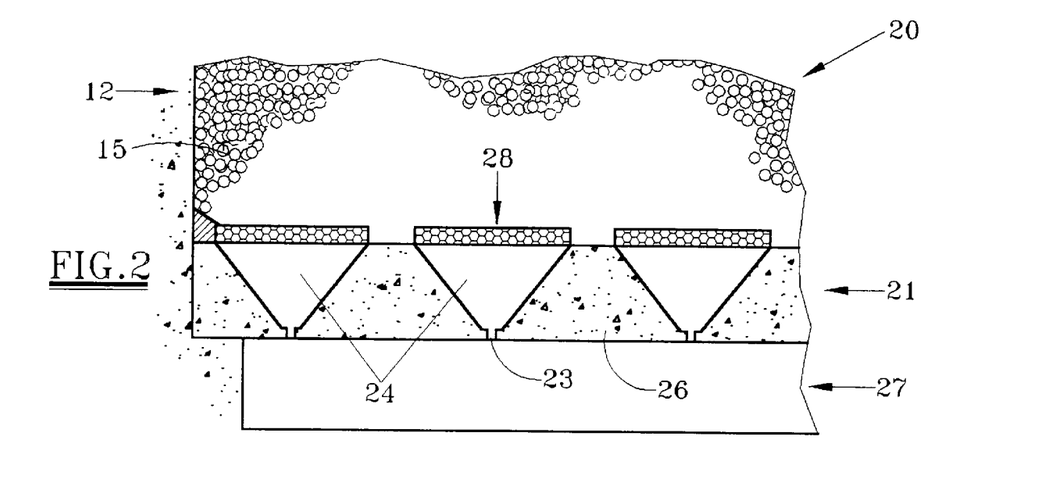
FIG. 2 is a cross-section of a monolithic false bottom filter underdrain system retrofitted according to one embodiment of this invention.

The method of this invention relates to retrofitting a gravity filter 50 as illustrated in FIG. 1, with a filter underdrain system 52 comprising a gravel media support bed 53. During the present method, the gravity filter 50 is retrofitted by replacing the gravel media support bed 53 with a porous plate media support 28 as depicted in FIG. 2. Prevalent gravity filters 50, used for filtering potable or waste water, comprise a monolithic false bottom underdrain system 52 for media support and backwash. A gravity filter 50 having a monolithic false bottom underdrain system 52 will be used herein to describe the practice of this invention for illustrative purposes only. The method of this invention can be practiced with other types of gravity filters commonly used for water filtration.

Typically, a layered gravel media support bed 53, is 12 to 18 inches in height. During the practice of this method, the layered gravel bed 53 is replaced with a porous plate media support 28, as illustrated in FIG. 2, that has a preferred thickness of from about one inch to about 2 inches. By eliminating the gravel bed 53 depicted in FIG. 1, the depth of the media 58, can be increased from about 10 to 16 inches thereby improving the filter's efficiency and significantly increased the filtration production rate.

Referring now to FIG. 2, preferably, the porous plate 28 of the retrofitted filter 20 comprises pores sized for uniform distribution of backwash to improve the cleansing of the media 15 of solid debris and flocculated particles. Also, while prior monolithic underdrain systems 52 with gravel support beds 53, as shown in FIG. 1, were limited to one method of backwash, water backwash, for cleansing of the media 15, the gravity filter 20 of FIG. 2, retrofitted according to a preferred method of this invention, is capable of improved cleansing by an air scour system.

Figure 7:
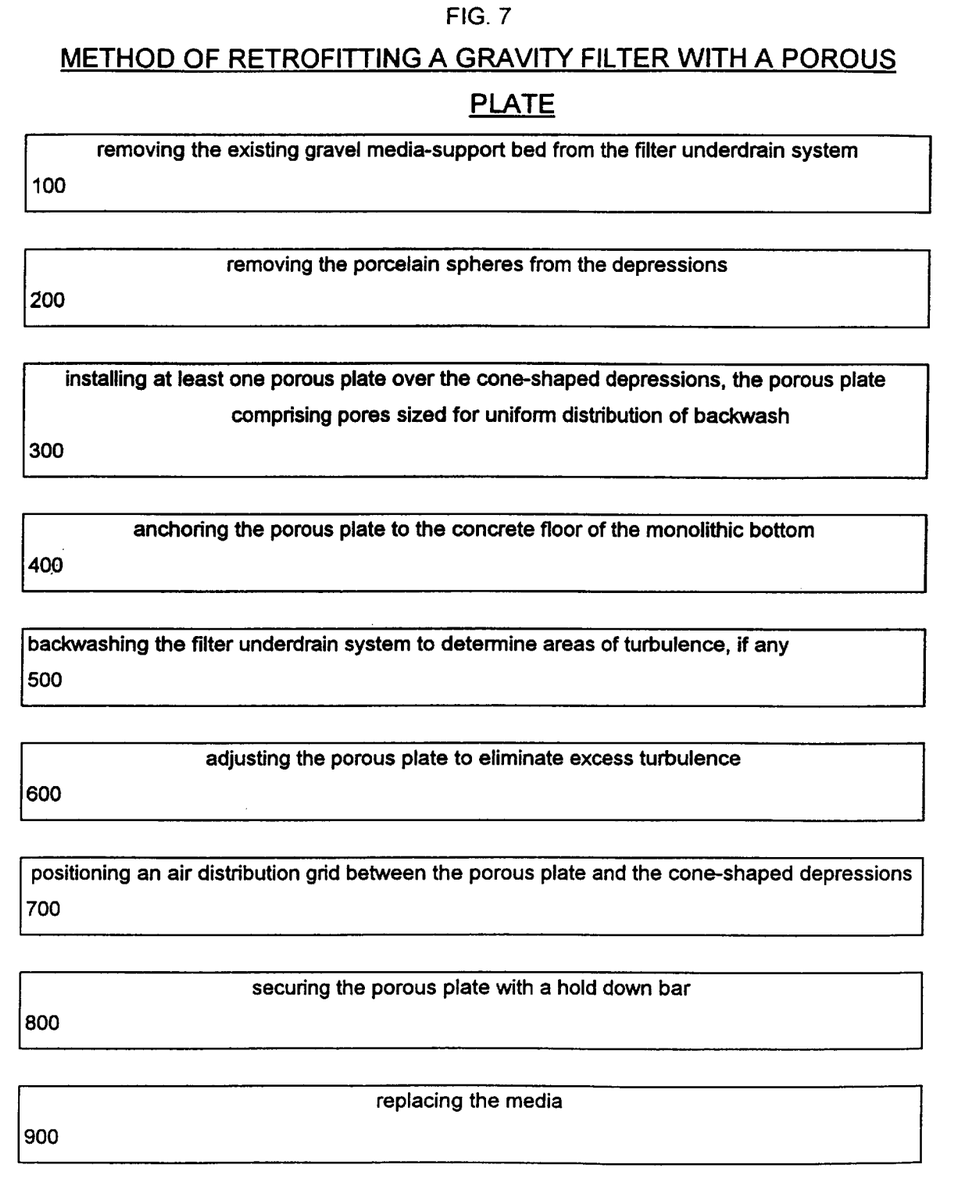
FIG. 7 is a flow diagram illustrating one embodiment of the method of this invention

Referring to the flowchart of FIG. 7 and the drawing of FIG. 1, the first step 100 of a preferred method of the present invention is removing the existing media 58 and gravel media-support bed 53 from the filter underdrain system 52. In a monolithic underdrain system, the underdrain system 52 is a false bottom overlaying the true flat-bottomed floor of the filter (not shown). The underdrain system 53 is comprised of a concrete bottom 54 having cone-shaped depressions 56 cast into the concrete. Porcelain spheres 57, usually one to three inches in diameter, are located within the cone-shaped depressions 56 to support the gravel bed 53.

A preferred method of removing the gravel 53 is vacuuming the underdrain system 52 with a high powered vacuum system. The porcelain spheres 57 are also removed according to the second step depicted 200 in flowchart 7, preferably by a vacuum process. During a preferred method, the entire underdrain area is vacuumed to facilitate removal of the gravel 53 and the spheres 57 as well as any loose media or debris that may have dropped into the area.

Figure 2A:
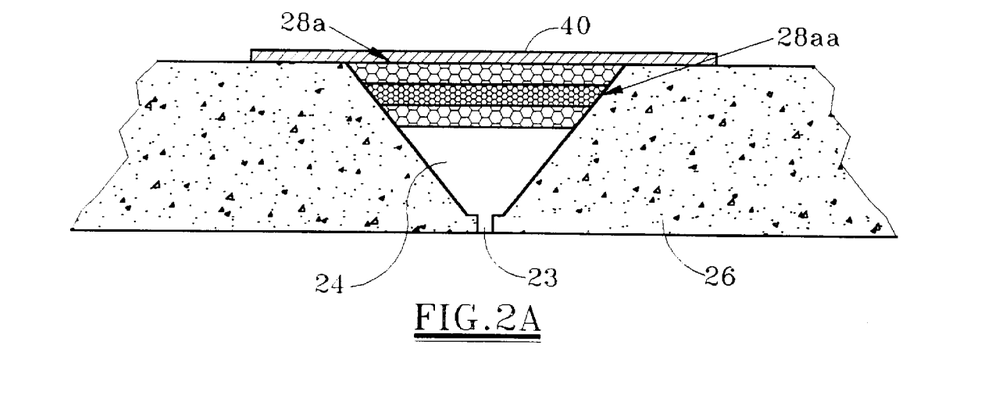
FIG. 2A is a cross-section of a monolithic false bottom filter underdrain system retrofitted according to another embodiment of this invention.
Figure 3:
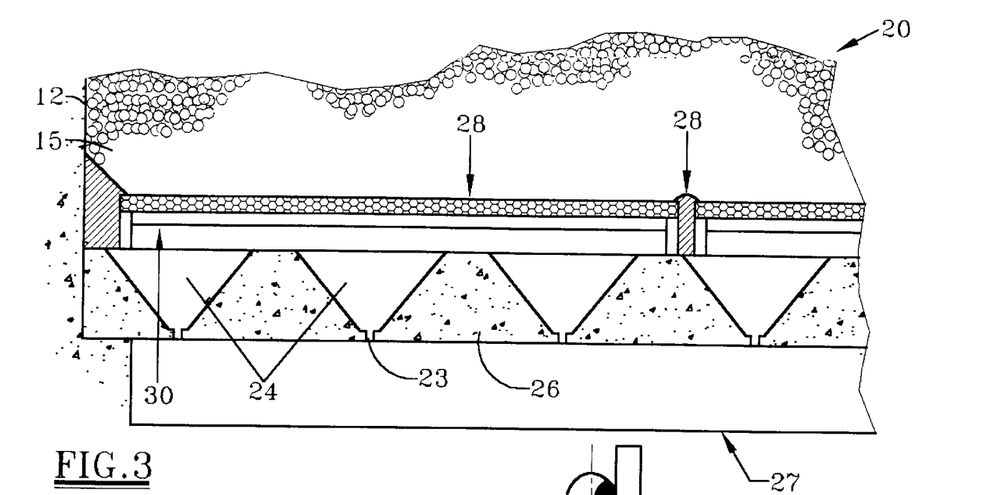
FIG. 3. is a cross-section of a retrofitted monolithic false bottom filter underdrain system illustrating an air distribution system.
Figure 6:
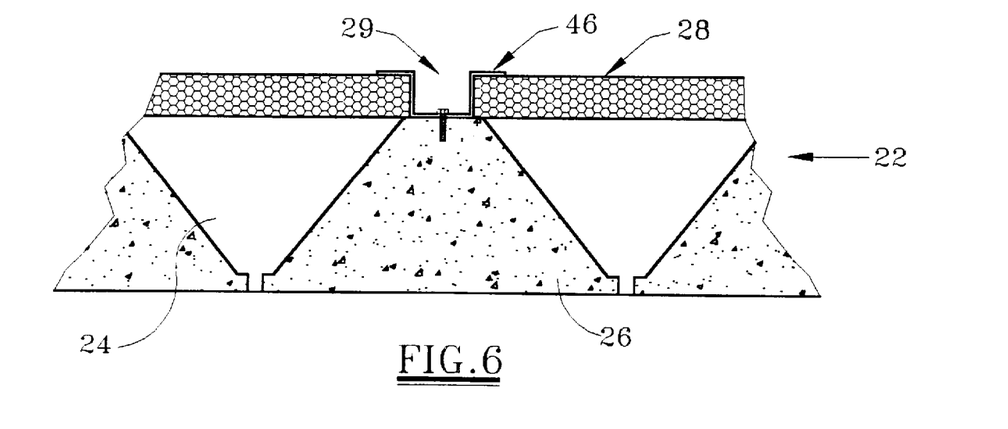
FIG. 6 is a cross-section of FIG. 4 taken along section B.

Referring now to FIG. 2, the next step 300 of the present method comprises installing at least one porous plate 28 over the cone-shaped depressions 24. The porous plate 28 is positioned between the media 15 and the monolithic bottom 21, thereby supporting and separating the filter media 15 from the monolithic underdrain system 22. According to one preferred method, prior to installing the porous plates 28, the top of the underdrain system 22 is marked with a template to designate the positioning of the porous plates 28. The concrete pyramids 26 of the underdrain system 22 are predrilled for screws and anchors and caulking laid out according to the markings. A porous plate 28 is positioned over the cone shaped depressions 26, secured in place by the caulking and stainless steel screws and then, according to next step 400, anchored to the concrete pyramids 26 of the monolithic underdrain system 22. Preferably, the porous plate 28 is anchored with expansion anchors. FIG. 6 illustrates one preferred method of further securing the porous plate 28 to the concrete pyramid 26 of the monolithic false bottom 21. Floor clips 46 are positioned between two plates 28a, 28b and fastened to the concrete pyramid 26. The grooves 29 between the plates 28a, 28b are then grouted. In one embodiment of the method of this invention, FIG. 2A, the porous plate 28a is fabricated to configure to the upper space of a cone-shaped depression 24. In a preferred embodiment as shown in FIG. 3, one porous plate 28 overlays three cone-shaped depressions 24.

The porous plate 28 of this invention may be manufactured from ceramics, metals, particularly sintered metals such as nickel, titanium, stainless steel and the like; and polymers, such as polyethylene, polypropylene or polystyrene; or any suitable material. In a preferred embodiment, the material is a sintered polyethylene. The porous plate 28 can be formed by sintering heat-fusible particles to the desired shape. Other heat-fusible materials may be used such as polypropylene or the above referenced group of materials. Referring to FIG. 2, the porous plate 28 can include one layer of a single porosity, 28 or as illustrated in FIG. 2A, the porous plate 28a can comprise adjacent layers of different porosity fused integrally together. Alternatively, the layers can be formed by stacking sheets of different porosity together where each sheet corresponds to a specific porosity layer (not shown).

The length and width of the porous plates 28 may vary according to the size of the perimeter at the top of the top of the cone-shaped depression. The dimensions of the perimeter at the top of the cone-shaped depression vary from about 5 inches by about 5 inches to about 9 inches by about 9 inches. The preferred thickness of the porous plate 28 varies from one inch or less to two inches or more, depending on the particular application. The porous plate 28 can comprise single-sized pores or, preferably, a relatively coarse pore size layer adjacent a relatively fine pore size layer with the coarse pore size layer adjacent the filter bottom. Referring to FIG. 2A, in a preferred embodiment of the invention, the porous plate 28a comprises a relatively coarse pore layer adjacent the monolithic underdrain system 22, another relatively coarse pore layer adjacent the filter media 15, and a fine pore 28aa size layer in between the coarse pore sized layers. Varying size pores are beneficial in media support systems. A fine pore layer is necessary to separate fine media 15, 0.1 to 0.5 mm sand for example, from the underdrain system. The fine pore layer prevents clogging of the underdrain system 22 and loss of filter media 15. The coarse pore layer of the porous plate 28 promotes the formation of large air bubbles which wash the filter system better than fine air bubbles. Also, if any media penetrates the porous plate 28 during the filtration cycle, it will accumulate in the top coarse pore layer and is readily washed out during the backwash cycle.

In a preferred embodiment, the pore size of the coarse layers range from 500 to 5000 microns. The pores in the fine pore layers range from 150 to 1500 microns. A preferred fine pore layer is about 300 microns. The pore size of the porous plate 28 used in the preferred method of this invention affects the distribution of the backwash as will be discussed below during the description of water and air backwash steps.

Figure 4:
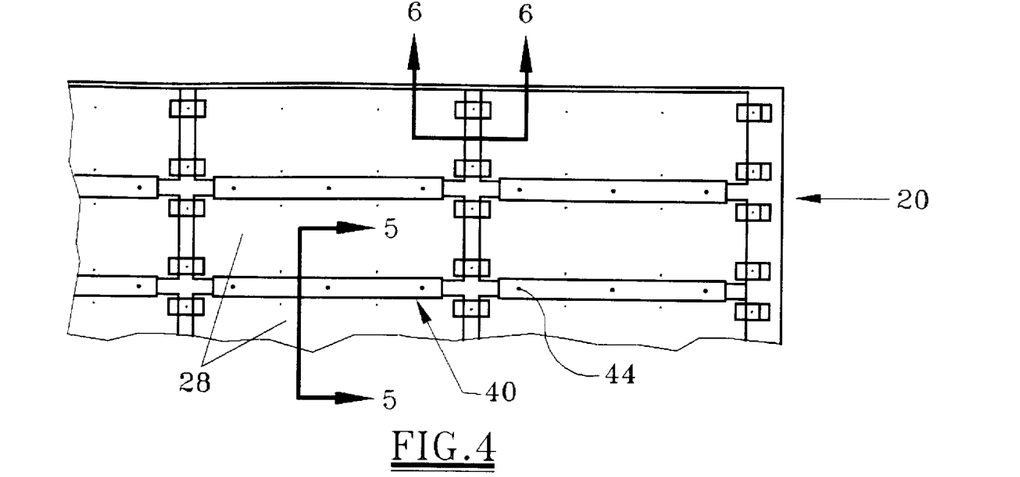
FIG. 4 is a plan view of a monolithic false bottom filter underdrain system retrofitted according to one method of this invention.
Figure 5:
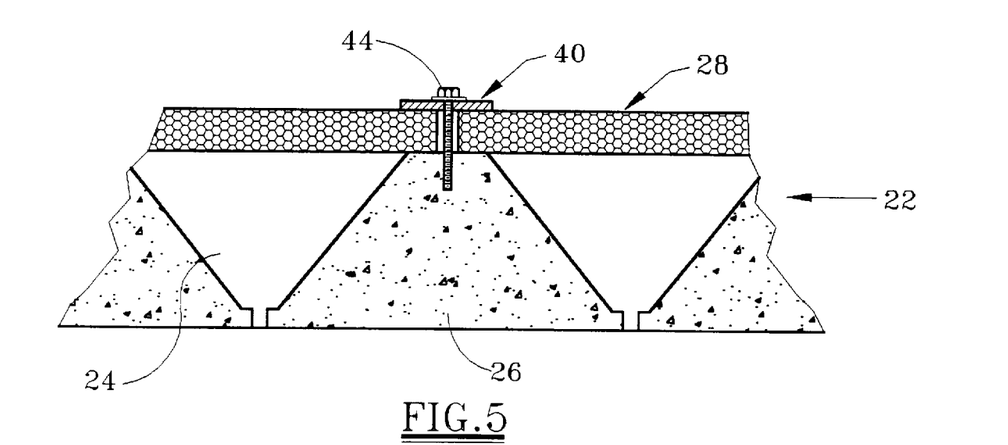
FIG. 5 is a cross-section of FIG. 4 taken along section A.

When a gravity filter employs a water backwash system without an air backwash system, additional measures are taken to prevent the hydraulic effect of large bubbles lifting the porous plate 28. For this type of gravity filter, as illustrated in FIGS. 4 and 5, and described in step 800 of the flowchart of FIG. 7, an alternate method of this invention includes the step of placing a hold down bar 40 over the edges of a porous plate 28 to prevent the loosening of the plate 28 during water backwash. The preferred hold down bar 40 is positioned between two porous plates 28a, 28b so that the bar 40 covers one edge of each plate 28a, 28b. The hold down bar 40 is then anchored to the concrete pyramid 26 of the monolithic false bottom 22, preferably by a wedge anchor 44.

Figure 3A:
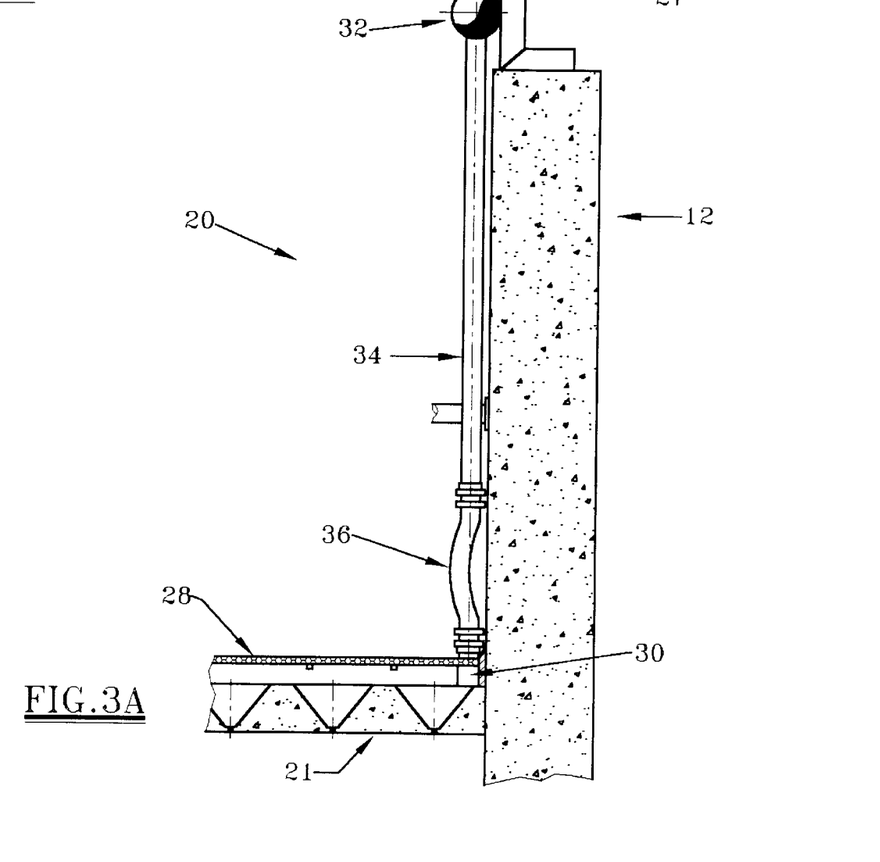
FIG. 3A. is a cross-section of a retrofitted monolithic false bottom filter underdrain system illustrating an air distribution system.

In an alternate embodiment of this invention, as described in the flowchart of FIG. 7, and depicted in FIGS. 2 and 3, an additional step 700 comprises positioning an air distribution grid 30 between the porous plate 28 and the cone-shaped depressions 24 prior to securing the porous plate 28. The air distribution grid 30 is part of an air backwash system. Compressed air can be used for air backwash to cleanse the filter media. Referring to FIG. 3A, backwash air from a compressed air source is supplied via a header pipe 32 to one or more drop pipes 34, located on either side of the filter housing 12, and into the air distribution grid 30. A preferred air distribution grid 30 is fabricated from stainless steel and is capable of distributing compressed air at the rate of from three to five cubic feet per minute per square foot. One or more fasteners, preferably stainless steel nails coated with a material that transforms into a sealant upon heating, are used to anchor the porous plate 28 to the air distribution grid 30.

The coated nail is driven through the porous plate 28 into the air distribution grid 30, perferrably by an explosive power source. The heat generated as the nail enter the stainless steel of the grid 30 transforms the coating into a sealant thereby making the porous plate 28 more secure.

After retrofitting a gravity filter 20 with a porous plate 28 and prior to replacing the media in the filter, the monolithic filter underdrain system 52 is tested to determine the uniformity of distribution of backwash and to discern if turbulence is occurring. Referring to FIG. 1, during the prior art backwash phase, water from backwash pumps (not shown) was pumped into the sump (not shown) below the monolithic false bottom 52, through porcelain thimble nozzles 55 located in the inverted apex of the cone-shaped depression 56, up through the gravel layers 53 and then percolated through the media 58 of the filter system 52. Turbulence resulted as the backwash traveled along the sloped walls of the cone-shaped depressions 56 and hit the gravel support layer 53 at a slower rate than the backwash traveling through the center area of the cone-shaped depression 56 (above the thimble nozzle 55). As a result of the turbulence, media 58 above the thimble nozzle 55 was subjected to a velocity of backwash greater than other areas of the media 58. High backwash flowrate is necessary to remove solid debris and flocculated particles, however. Uneven distribution of backwash results in inefficient cleansing of media in areas receiving the slower backwash flowrate.

Referring now to FIG. 2, after the installation of a porous plate 28 according to one preferred method of this invention, the distribution of backwash is flattened so that turbulence within the media is minimized. The porous plate 28 dissipates the jet pattern coming from the thimble nozzles 23 thereby subjecting the media to a more even distribution of backwash without significant head loss. Cleansing of the media is significantly improved.

As depicted in the flowchart of FIG. 7, during a preferred method of retrofitting, after installation 300 of the porous plate, the gravity filter is tested 500 with a water backwash prior to replacing the media to determine if turbulence is occurring. Turbulence would occur with the porous plate media support 28 if the plate 28 is loose or incorrectly sealed. If any turbulence is detected, the porous plate 28 is removed and reinstalled with the required anchoring and sealants so that turbulence minimized. After testing for turbulence and making any required adjustments, the media is replaced 900 and the filter 20 is ready for use. The preferred media 15 used with the retrofitted gravity filter 20 is sand and/or coal.

Operation of the filtration cycle can now be initiated by starting the flow of influent into the filter housing 12. Periodically, the filtration process can be stopped so that the filtration system may be backwashed.

Figure 8:
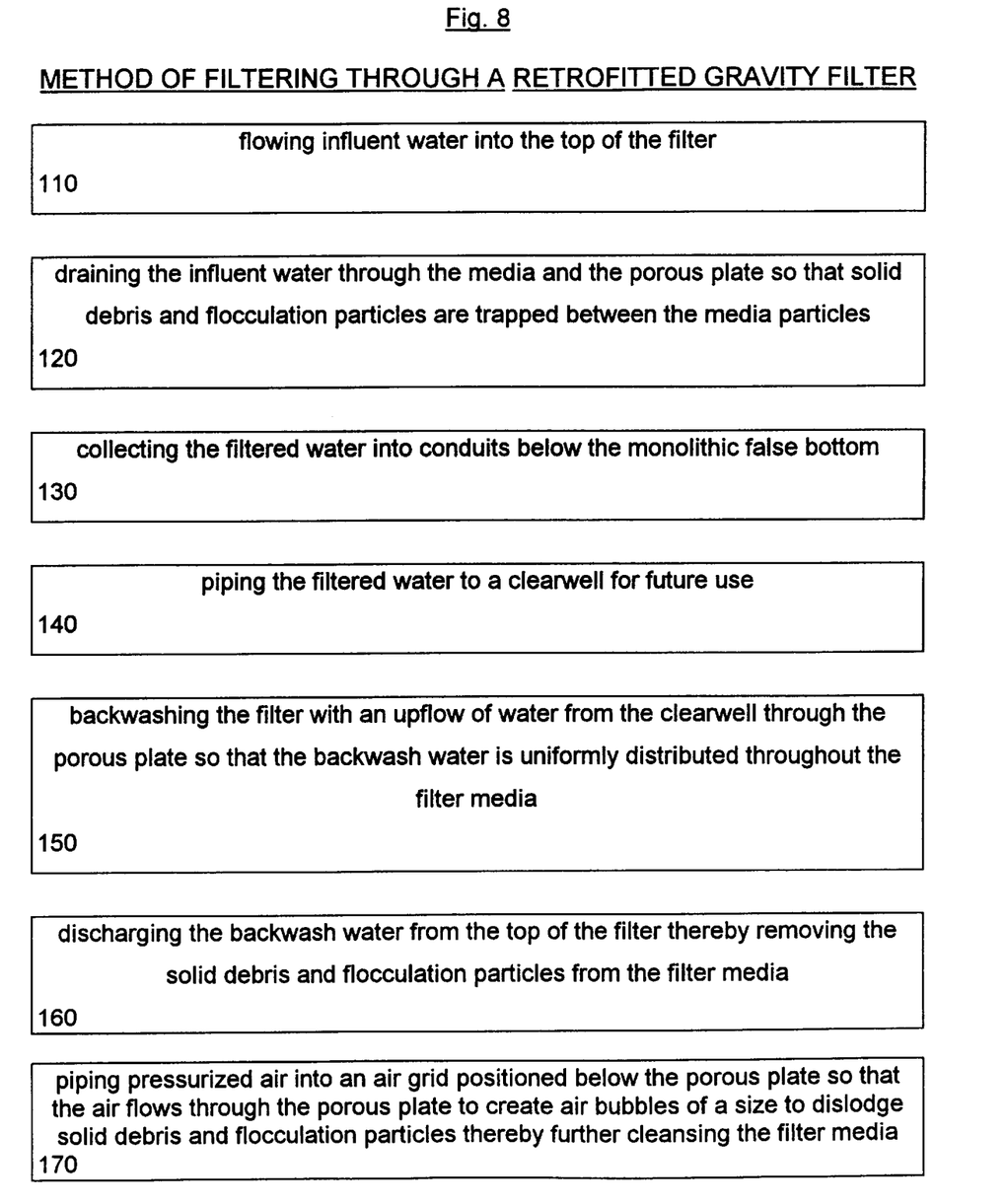
FIG. 8 is a flow diagram illustrating another embodiment of the method of this invention

The flowchart of FIG. 8 describes a preferred method of filtering water through a retrofitted gravity filter 20 as shown in FIG. 2. The gravity filter 20 used in this method comprises upright walls defining at least one compartment 12 that houses granular filter media 15 supported above a true filter bottom 27 by a monolithic false bottom filter underdrain system 22. The retrofitted monolithic underdrain system 22 uses a porous plate 28 as its media support system. The porous plate 28 has pores sized for uniform distribution of backwash. The method of filtration according to the flowchart of FIG. 8 comprises the steps of: (a) flowing influent water into the top of the filter 110; (b) draining the influent water through the media 15 and the porous plate 28 so that solid debris and flocculated particles are trapped between the media particles 120; (c) collecting the filtered water into conduits below the monolithic false bottom 130; (d) piping the filtered water to a clearwell for future use 140; (e) backwashing the filter with an upflow of water from the clearwell through the porous plate 28 so that the backwash water is uniformly distributed throughout the filter media 150; and (f) discharging the backwash water from the top of the filter 20 thereby removing the solid debris and flocculated particles from the filter media 160. During the backwash phase of the filtration cycle, normal downward filtration stops and an upflow of liquid, usually water and/or gas, usually compressed air, cleanse the filter system.

If the gravity filter has also been retrofitted with an air distribution grid 30 for air backwash as depicted in FIG. 3, an alternative method can include the step 170 of piping pressurized air into an air grid 30 positioned below the porous plate 28 so that pressurized air flows through the porous plate 28 to create air bubbles of a size to dislodge solid debris and flocculated particles thereby further cleansing the filter media 15.

During one embodiment of the method of this invention, the water/air backwash is concurrent. In an alternative embodiment, the water/air backwash is sequential. In the sequential water/air backwash method, air is piped in first from a compressed air source at a rate ranging from about three to five cubic feet per minute per square foot. The compressed air is piped from a header pipe 32 via drop pipes 34 to the air distribution grid 30 and up through the filter system 20. The air backwash phase lasts for about one to two minutes. The air backwash is followed by a three-phase water backwash, the first phase starting at a rate ranging from five to seven gallons per square foot per minute and lasting for about two minutes, the second phase increasing the rate to a range of about seventeen to twenty gallons per square foot per minute, and lasting for about ten minutes; and than decreasing down to the third phase back to rate of about five to seven gallons per square foot per minute and lasting for about two minutes. During the backwash, the media 15 within the filter 20 is suspended and media particles gyrated to loosen solid debris and flocculated particles which then float upwards and out with the effluent backwash water.

During a concurrent air/wash backwash, the air backwash is concurrent with the first phase of the water backwash at the same rates of flow as described above. After backwashing, the backwash water and air flows are turned off, the media 15 settles down and filtration may begin again.

On site experimental testing procedures were conducted to visually compare a gravity filter having a gravel layer media support system with a gravity filter retrofitted according to the method of this invention. After retrofitting a gravity filter having a monolithic underdrain system according to the method of this invention, six-inch piles of sand were placed over the porous plate media support system by a hydraulic hopper. The filter was water backwashed and then drained. The media was inspected for signs of turbulence. It was observed that the media was evenly distributed above the media support plate indicating the absence of turbulence. Similar observations of filters employing gravel media support beds indicated turbulence within the media by uneven distribution of the sand. If the velocity of the backwash is too high, the porcelain spheres vibrate unnecessarily causing premature concrete deterioration and gravel disruption in the area above the spheres. The turbulence in the gravel layers travels through to the media forming disruptive jet patterns in the media. Particles of media pass through to the false bottom clogging the system, thereby requiring expensive downtime of the filter.

During the experimental testing, it was also determined that the gravel media support system consumed water during the backwash at the rate of 20 gallons per minute per square foot. The rate of water consumption with a retrofitted gravity filter decreased to approximately 16 or 17 gallons per minute per square foot with the same effectiveness of cleansing. Since the water used for backwash is filtered water, the retrofitted gravity filter is able to greatly increase its production of filtered potable water by reducing the quantity of filtered water needed for backwashing.

The foregoing description is illustrative and explanatory of preferred embodiments of the invention, and variations in the size, shape, materials and other details will become apparent to those skilled in the art. It is intended that all such variations and modifications which fall within the scope or spirit of the appended claims be embraced thereby.

What is claimed is:

1. A method for retrofitting a gravity filter having a monolithic false bottom filter underdrain system comprising a concrete bottom wherein the concrete bottom forms cone-shaped depressions, the underdrain system further comprising porcelain spheres positioned within the depressions to support a media and gravel media-support bed, the method comprising the steps of:

(a) removing the existing media and gravel media-support beds from the filter underdrain system;

(b) removing the porcelain spheres from the depressions;

(c) replacing the gravel media support bed and porcelain spheres with at least one continuously porous plate over at least one cone-shaped depression, said continuously porous plate having pores sized for uniform distribution of backwash and comprising at least two layers, a first relatively coarse pore size layer beneath a juxtaposed second relatively fine pore size layer;

(d) anchoring said continuously porous plate to the concrete bottom; and (e) replacing the media removed in step (a).

2. The method of claim 1 wherein the cone-shaped depressions comprise an upper space and a lower space and each of said continuously porous plates is configured to closely conform to the upper space of each of the cone-shaped depressions.

3. The method of claim 1 wherein each said continuously porous plate has sufficient horizontal dimensions so that a plurality of cone-shaped depressions are overlaid by each said continuously porous plate.

4. The method of claim 1 wherein said first relatively coarse pore size layer comprises pores within a range of about 500 microns to about 5000 microns and said second relatively fine core size layer comprises pores within a range of about 150 microns to 1500 microns.

5. The method of claim 1 wherein said continuously porous plate further includes a third relatively coarse pore size layer above said second relatively fine pore size layer.

6. The method of claim 1 further comprising the step of positioning an air distribution grid between said continuously porous plate and the cone-shaped depressions.

7. The method of claim 1 wherein the step of anchoring said continuously porous plate includes securing it with a hold-down bar to prevent lift during backwash.

8. The method of claim 1 further comprising the step of water backwashing the filter underdrain system to determine areas of turbulence.

9. The method of claim 8 further comprising the step of adjusting each of said at least one continuously porous plates to minimize excess turbulence.

* * * * *